United States Patent Office 2,914,417
Patented Nov. 24, 1959

2,914,417

TREATMENT OF HYDROCARBON LIQUIDS

Walter M. Chamot, Brookfield, and John M. Ferrara, Chicago, Ill., assignors to National Aluminate Corporation, Chicago, Ill., a corporation of Delaware No Drawing. Application August 7, 1956
Serial No. 602,517

3 Claims. (Cl. 106—243)

The present invention relates to a method of reducing the discoloration imparted to hydrocarbon liquids by heavy metal soaps and complexes. It also relates to new chemicals for use in coating compositions, particularly paints and varnishes, containing heavy metal soaps as driers. More particularly it concerns itself with the chemical treatment of catalytically cracked hydrocarbon liquids, specifically fuels, wherein such hydrocarbon liquids contain trace amounts of heavy metals which tend to cause color instability and sludge formation. In another aspect the invention is concerned with new chemical compositions.

In the manufacture of coating compositions, such as paints and varnishes, it is often the practice to add to the product from about .001% to .10% by weight of certain heavy metal compounds, usually in the form of a soap, as driers. The heavy metal soaps so employed are usually the naphthenates, resinates or linoleates of such heavy metals as lead, cobalt, manganese, iron, zinc and calcium. These metallic soaps are said to be either basic, neutral or acid depending upon the metal used, the proportion of the acid and other factors. They are thought by some to be more in the nature of ionic complexes rather than soaps per se but for present purposes such is not deemed critical.

In the formulation of paint driers it is usually the practice to blend a heavy metal soap, or combinations of two or more heavy metal soaps into a suitable hydrocarbon liquid. These blends are then further admixed with the vehicles, resins, pigments, toners, etc. to produce the finished product. Many of the heavy metal soaps and complexes are highly colored materials and when blended with water-white or light colored hydrocarbon liquids they impart their color to the liquids or form colored complexes with such liquids which tend to discolor paint and varnish formulations into which they are incorporated. It would be desirable to decrease the drying time of paints and varnishes by using more drier, in some instances. This is not possible because of the darkening effect of the drier.

It is important in paint and varnish formulations to choose the proper solvents and thinners for the drying agents so they will uniformly disperse or dissolve throughout the formulation. Several well known solvents for this purpose are such materials as turpentine, aromatic hydrocarbons and the highly aromatic solvents derived from petroleum which are all described in the volume "Paint and Varnish Technology" by William von Fischer, Reinhold (1948). The most offensive solvent from a standpoint of discoloration caused by heavy metal soaps, particularly cobalt soaps, is turpentine. It would be desirable if a chemical were available which would not only alleviate the problem of discoloration of hydrocarbon oils by heavy metal soaps and complexes but also would be a dispersant for such systems.

A similar problem in connection with heavy metals in hydrocarbon liquids is the tendency of trace amounts of such metals to cause color degradation and sludge formation in catalytically cracked hydrocarbon liquids of the furnace distillate and diesel fuel type. The exact mechanism by which catalytically cracked fuels degrade in the presence of heavy metals is not known. The metals are believed to get into the finished product in several ways. The most common cause of deleterious metals to be present in hydrocarbon fuels is that of contact with metal surfaces. Other sources are carryover in the processing of crude stocks and contamination by contact with cracking catalysts containing metals.

The catalytically cracked fuels of the furnace distillate and diesel fuel type usually boil in the range of about 580° F. to 640° F. and may have end points in excess of 750° F. They are either used as produced or are blended with thermally cracked or straight run stocks. Any fuel containing 10% by weight or more of catalytically cracked stock is deemed to be within the ambit of the invention. Trace amounts of heavy metals present in such fuels is meant to include amounts as high as 50 parts per million of such metals.

It is common practice to employ chemical additives to treat catalytically cracked fuels to prevent color degradation and sludge formation. A useful additive for this purpose is formaldehyde whose use in catalytically cracked fuels as a color and sludge stabilizer is described in detail in Carnell, U.S. Patent 2,560,632, the disclosure of which is incorporated herein by reference. While in most instances formaldehyde gives good results when used as a stabilizer it would be desirable to employ another compound which of itself would possess stabilizing activity and would also synergize the stabilizing activity of formaldehyde when used in combination therewith.

It is therefore an object of the invention to provide a chemical treatment for hydrocarbon liquids whereby discoloration thereof caused by the presence of heavy metal soaps is substantially reduced or mitigated.

Another object is to provide chemicals which when added to coating compositions such as paints and varnishes will prevent the discoloration thereof occasioned by heavy metal soap driers often occurring in such coating compositions.

A further object is to furnish chemicals which will stabilize catalytically cracked fuel oils against color degradation and sludge formation occasioned by the presence of trace amounts of heavy metals.

Yet another purpose is to provide a synergist for formaldehyde when it is used as a stabilizer for catalytically cracked fuels.

Still another object is to provide a chemical agent for incorporation into paints and varnishes which would allow more heavy metal soaps and complexes to be added thereto, thus decreasing the drying time, and yet not affecting the color of said paints and varnishes.

A still further object is to provide chemical compositions which are effective in obtaining the objects set forth above in small, yet effective amounts. Other objects will appear hereinafter.

In accordance with the invention it has been found that the discoloration imparted to hydrocarbon liquids by heavy metal soaps and complexes may be substantially reduced or diminished by treating said liquids with a decolorizing amount of an oil soluble carboxylic acid salt of a polyamine. These amine salts are effective in complexing or reacting with heavy metal soaps or complexes at relatively small yet effective dosages. For most heavy metals such as cobalt, chromium, vanadium, lead, manganese, iron, zinc and calcium it is only necessary in some applications to use from a few to several hundred parts per million of the compositions of the invention. In stabilizing catalytically cracked fuels good results are obtained when as little as 2 parts per million are used with superior results manifesting themselves at 15 to 250 parts per million of treatment. In some cases, when particularly unstable fuels are encountered, it may be necessary to use as much as 500 parts per million to achieve satisfactory color and sludge stabilization.

When coating compositions containing heavy metal soap driers are treated with the polyamine salts of the invention it is desirable to use enough polyamine salt to provide at least one amino group and preferably two amino groups for every mol of heavy metal present in the system to be treated. In some cases where a dispersing action is relied upon to prevent heavy metal soap discoloration, amounts less than those specified may be used. It should be noted, however, the invention is not limited to quantities since only experimentation can adequately determine the optimum treatments necessary for a given problem. The dosage ranges set forth herein are therefore intended as guides rather than limitations.

The oil soluble carboxylic acid polyamine salts useful in the practice of the invention are derived from an oil soluble or dispersible organic carboxylic acid and a polyamine from the group consisting of alkylene diamines and alkylene polyamines. Illustrative of the alkylene diamines are such compounds as ethylene diamine, propylene diamine and hexamethylene diamine. Examples; the polyalkylene polyamines are diethylene triamine, triethylene tetramine and tetraethylene pentamine. If the alkylene diamines or the alkylene polyamines contain substituent groups such as hydroxy alkyl groups such compounds are included within the scope of the invention. Two such compounds would be hydroxyethylethylene diamine and 1,3-diamino-2-propanol.

Another class of polyamines that may be used are the complex still residues remaining from the production of alkylene amines and alkanol amines. One such complex still residue is Polyamine H which is a still residue remaining from the production of ethylene amines. In the manufacture of ethylene amines, ethylene dichloride is reacted with ammonia. The reaction conditions vary but in all cases a mixture of the members of the series is obtained. At comparatively low temperatures and pressures predominantly ethylene diamine is formed together with some polyethylene polyamines. At higher temperatures and pressures the proportion of the polyethylene polyamines is higher. In the recovery of the higher molecular weight polyethylene polyamines by distillation there remains a still residue which constitutes the Polyamine H and consists of homologues higher than tetraethylenepentamine. Similar still residues from the production of other polyalkylene polyamines such as polypropylene polyamines are suitable for use in preparing the salts employed for the purpose of the invention.

The carboxylic acids used in preparing the polyamine salts are numerous. They are usually aliphatic and contain at least 8 carbon atoms preferably at least 12 carbon atoms and most preferably from 16 to 18 carbon atoms in a hydrocarbon chain. Although branched chain, alicyclic or other type acids may be used, the unsaturated fatty acids are by far the most suitable for employment in the preparation of salts of polyamines. The acids may be used in varying amounts but experience has shown the monocarboxylic salts to be the best in performance. The dimonocarboxylic acid salts may be used with good results being obtained in most cases. Examples of several acids that may be used are:

| | |
|---|---|
| Caproic | Palmitoleic |
| Caprylic | Oleic |
| Capric | Gadoleic |
| Lauric | Erucic |
| Myristic | Riconoleic |
| Palmitic | Linoleic |
| Stearic | Linolenic |
| Arachidic | Eleostearic |
| Behenic | Licanic |
| Lignoceric | Arachidonic |
| Lauroleic | Clupanodonic |
| Myristoleic | |

Mixtures of acids from naturally occurring fats and oils may be used.

The polyamine carboxylic acid salts are prepared by mixing the acid into the polyamine with stirring until the ingredients are blended into a uniform composition. No heat is necessary since the heat of solution is generally sufficient to form the salt. The amine may be added to the acid but such a procedure is not too desirable particularly when the monocarboxylic acid salts are the product intended to be made since such an addition sequence seems to favor the formation of poly- rather than monocarboxylate salts.

In the use of metallic soaps as driers for paints and varnishes it is often the practice of the art to add one or more metal soaps or complexes to the formulation to produce various desired results. Lead soaps, for instance, are not too active as driers and hence it is sometimes necessary to use as much as 1% by weight of metallic lead to achieve the desired drying characteristics. The most active and perhaps the most important drier is cobalt. It is used in paints and varnishes in concentrations ranging from a few thousandths to a few tenths of a percent by weight.

In some cases cobalt compounds form complexes with the hydrocarbon liquids and the discolorations are of various undesirable hues, usually green. A good illustration of this latter phenomena is the addition of cobalt soaps and complexes to turpentine with a resultant offgreen color being formed.

Manganese is a good drier and affords a rapid acting agent for this purpose. It tends, however, to produce a staining effect due to the manganic ion in the final dried film. When compositions of the invention are employed this staining effect is substantially lessened.

Calcium and zinc are not driers per se but when combined with cobalt or lead they tend to prevent the formation of surface wrinkles in the dried film, control setting time and perform other useful functions in the formulation of the particular coating composition in which they are employed.

Iron soaps and complexes are light (ferrous) or dark (ferric) brown in color and are only used in very dark finishes. Finishes containing iron usually must be heated to give optimum results.

Calcium, zinc and lead soaps are light in color and hence do not produce the characteristic discolorations in hydrocarbon liquids such as are associated with the use of manganese, iron or cobalt soaps. These light colored soaps, however, do form a light haze when dispersed or dissolved in hydrocarbon liquids and hence have an adverse effect on the color of paints or varnishes into which they are formulated. The compositions of the invention are believed to complex with and/or disperse these soaps in hydrocarbon solvents and thinners thus making less offensive their effects to the color of coating compositions.

When used in combination with formaldehyde in the stabilization of catalytically cracked fuels it is desirable to use an excess of the polyamine carboxylic acid salt. The exact amount, of course, depends on a number of factors, particularly the amounts of trace metals present in the fuel, the type of fuel, etc. Generally good results are obtained when the weight ratio of polyamine carboxylic acid salt to formaldehyde is about 2:1. This weight ratio may be varied to say from about 1:1 to about 10:1.

The polyamine carboxylic acid salts and formaldehyde may be added separately to the oil to be treated or they may be blended into a mutual solvent.

Several typical carboxylic acid polyamine salts contemplated as being within the scope of the invention are listed below in Table I.

TABLE I

| Composition A | Acid | Polyamine | Mol Ratio, Acid: Polyamine |
|---|---|---|---|
| I | Oleic | tetraethylenepentamine | 1:1 |
| II | do | do | 2:1 |
| III | do | diethylenetriamine | 1:1 |
| IV | do | do | 2:1 |
| V | do | aminoethylethanolamine | 1:1 |
| VI | Stearic | tetraethylenepentamine | 1:1 |
| VII | Ricinoleic | Polyamine H | 2:1 |
| VIII | Lenoleic | diethylenetriamine | 2:1 |
| IX | Myristic | tetraethylenepentamine | 1:1 |
| X | Palmitic | hexamethylenediamine | 1:1 |
| XI | Myristic | diethylenetriamine | 1:1 |
| XII | Linoleic | Polyamine T | 1:1 |
| XIII | Palmitoleic | tetraethylenepentamine | 1:1 |
| XIV | Caproic | ethylenediamine | 1:1 |
| XV | Oleic | do | 1:1 |
| XVI | Coconut oil | tetraethylenepentamine | 2:1 |
| XVII | Tallow fat | do | 1:1 |
| XVIII | Caster oil | Polyamine H | 1:1 |
| XIX | Soybean oil | diethylenetriamine | 1:1 |

In order to illustrate the advantages, novelty, and utility of the invention the following examples are given by way of illustration.

Example I

A light, catalytically cracked fuel oil was treated with several parts per million of metallic cobalt, in the form of a cobalt naphthenate, and several compositions of the invention. At the end of 30 minutes NPA color readings were taken. The results of these tests are listed below in Table II.

TABLE II

| Treatment | NPA Color |
|---|---|
| Blank | 1+ |
| Cobalt naphthenate (6 p.p.m. cobalt) | 4+ |
| Cobalt octoate (6 p.p.m. cobalt)+250 p.p.m. Composition I | 1+ |
| Cobalt octoate (6 p.p.m. cobalt)+250 p.p.m. Composition III | 1+ |

Example II

The oil treated in this example was a blend consisting of 35% catalytically cracked stock and 65% straight run. It was treated with composition of the invention above and in combination with formaldehyde. The oil thus treated was stored in a dark room the temperature of which was cycled at 110° F. At the end of eight weeks the results listed below in Table III were observed.

TABLE III

| Treatment | NPA Color | Sludge |
|---|---|---|
| Blank | 2 | Medium. |
| 125 p.p.m. of n-propyl formcel (40% formaldehyde) | 2 | Light. |
| 125 p.p.m. of Composition I containing 8% formaldehyde | 1½ | Very light. |
| 125 p.p.m. of Composition I | 2 | Do. |

The above clearly shows the advantages obtained by using the compositions of the invention either alone or in combination with formaldehyde.

Example III

In a series of tests the liquid used was turpentine to which had been added 200 parts per million of naphthenates of iron (ferrous), cobalt, zinc, chromium and lead. Several compositions of the invention were added at 150 parts per million. In each instance there was an improvement in the color of the treated solution.

The reactions and products formed between the compositions of the invention and hydrocarbon liquids containing heavy metal soaps and complexes are not fully understood but they are believed to be new and novel and heretofore unknown.

The invention is hereby claimed as follows:

1. Turpentine containing from .001% to .10% by weight of a cobalt soap and from 2 to 500 parts per million of the oleic acid salt of tetraethylene pentamine.

2. A solvent for paints and varnishes which comprises a major portion of turpentine, from .001% to .10% by weight of a heavy metal soap drier and a decolorizing amount of a carboxylic acid salt of a polyamine from the group consisting of monoalkylene diamines and polyalkylene polyamines, said carboxylic acid containing at least 8 carbon atoms.

3. A solvent for paints and varnishes which comprises a major portion of turpentine and from .001% to .10% by weight of a heavy metal soap drier from the group consisting of the soaps of lead, cobalt, manganese, iron, chromium, zinc and calcium and from 2 to 500 parts per million of a fatty acid salt of a polyamine from the group consisting of monoalkylene diamines and polyalkylene polyamines, said fatty acid containing at least 12 carbon atoms.

References Cited in the file of this patent

UNITED STATES PATENTS

| | | |
|---|---|---|
| 2,199,828 | Boydan | May 7, 1940 |
| 2,199,829 | Boydan | May 7, 1940 |
| 2,243,485 | Musselman | May 27, 1941 |
| 2,267,240 | Kummel | Dec. 23, 1941 |
| 2,312,082 | Dietrich | Feb. 23, 1943 |
| 2,329,251 | Chenicek | Sept. 14, 1943 |
| 2,345,632 | Robinson | Apr. 4, 1944 |
| 2,360,283 | Rutherford | Oct. 10, 1944 |
| 2,369,490 | Proell | Feb. 13, 1945 |
| 2,600,943 | Valkenburg | June 17, 1952 |